United States Patent
Kluge et al.

(10) Patent No.: US 9,758,231 B2
(45) Date of Patent: Sep. 12, 2017

(54) RUDDER BEARING

(75) Inventors: Mathias Kluge, Hamburg (DE);
Monika Jandt, Seevetal (DE)

(73) Assignee: becker marine systems GmbH & Co. KG, Hamburg (DE)

( * ) Notice: Subject to any disclaimer, the term of this patent is extended or adjusted under 35 U.S.C. 154(b) by 0 days.

(21) Appl. No.: 13/222,308

(22) Filed: Aug. 31, 2011

(65) Prior Publication Data

US 2012/0051674 A1  Mar. 1, 2012

(30) Foreign Application Priority Data

Sep. 1, 2010  (DE) .................. 10 2010 036 093

(51) Int. Cl.

| | |
|---|---|
| *F16C 33/20* | (2006.01) |
| *F16C 17/02* | (2006.01) |
| *F16C 17/04* | (2006.01) |
| *F16C 33/10* | (2006.01) |
| *B63H 25/52* | (2006.01) |
| *F16C 17/10* | (2006.01) |
| *F16C 17/03* | (2006.01) |
| *F16C 17/06* | (2006.01) |
| *F16C 33/12* | (2006.01) |
| *F16C 43/02* | (2006.01) |

(52) U.S. Cl.
CPC .............. *B63H 25/52* (2013.01); *F16C 17/03* (2013.01); *F16C 17/06* (2013.01); *F16C 17/10* (2013.01); *F16C 33/121* (2013.01); *F16C 43/02* (2013.01); *F16C 2226/78* (2013.01); *F16C 2326/30* (2013.01)

(58) Field of Classification Search
CPC .......... F16C 17/00; F16C 17/26; F16C 17/14; F16C 33/046; F16C 33/108; F16C 33/24; F16C 33/28; F16C 43/02; F16C 2226/76; F16C 2226/78

USPC ................... 384/97, 129, 276, 295, 499, 569
See application file for complete search history.

(56) References Cited

U.S. PATENT DOCUMENTS

| | | | | |
|---|---|---|---|---|
| 1,644,611 | A | * | 10/1927 | Rieffert .................. F16C 33/60 384/501 |
| 2,048,380 | A | * | 7/1936 | Hansen .......................... 16/387 |
| 3,106,101 | A | * | 10/1963 | Harriman ................ F16H 55/30 403/344 |
| 3,455,619 | A | | 7/1969 | McGrath |
| 3,542,440 | A | | 11/1970 | Brand |
| 3,565,498 | A | | 2/1971 | Leopard et al. |

(Continued)

FOREIGN PATENT DOCUMENTS

| | | |
|---|---|---|
| AT | 187758 B | 11/1956 |
| CN | 2714882 Y | 8/2005 |

(Continued)

OTHER PUBLICATIONS

William D. Callister, Jr, Materials Science and Engineering: An Introduction, 2007, John Wiley and Sons, Inc, Seventh Edition, pp. 137-138 and A6-A7.*

*Primary Examiner* — Richard W Ridley
*Assistant Examiner* — Brian McGovern
(74) *Attorney, Agent, or Firm* — Kelly & Kelley, LLP

(57) ABSTRACT

A bearing element is provided which has at least three individual annular segments which are each combined to form a homogeneous, inherently fixed bearing element. The individual annular segments each abut against at least two further annular segments and are interconnected by connecting means.

12 Claims, 8 Drawing Sheets

(56) References Cited

U.S. PATENT DOCUMENTS

Figure 1:
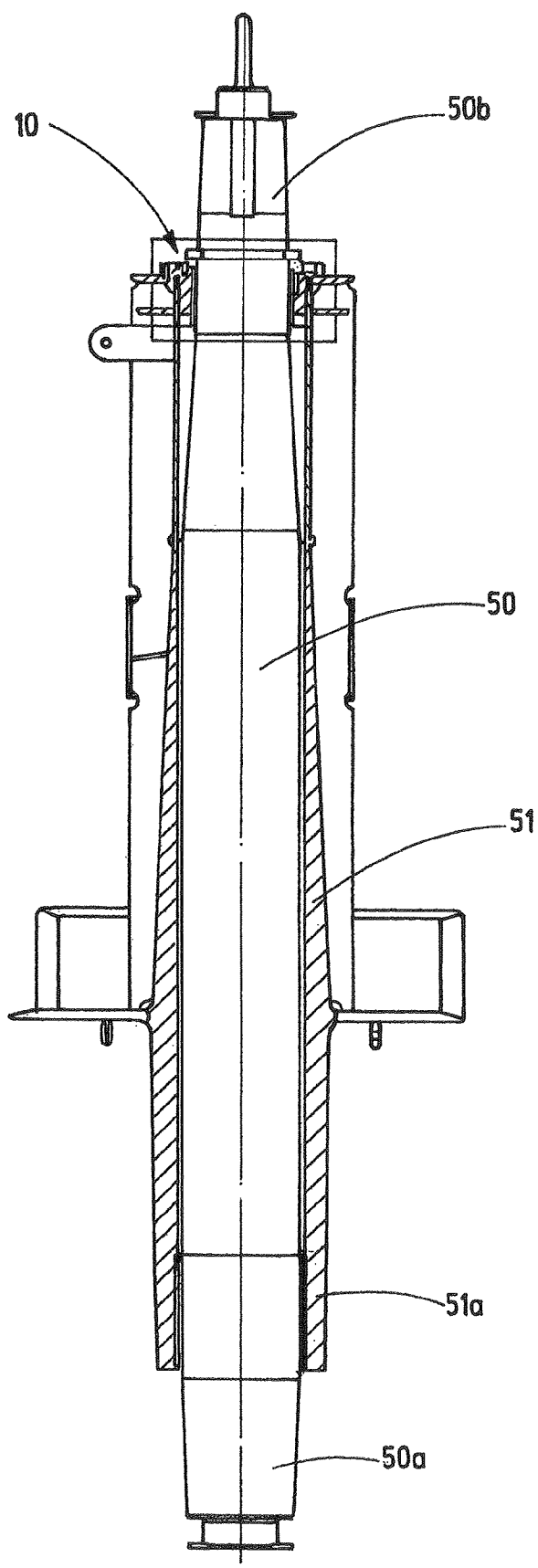

| | | | |
|---|---|---|---|
| 3,918,770 A | 11/1975 | Rouch | |
| 4,160,607 A * | 7/1979 | Reichow | A01K 87/02 16/225 |
| 4,540,294 A * | 9/1985 | Lamperski et al. | 384/273 |
| 4,737,539 A * | 4/1988 | Jinno et al. | 524/508 |
| 4,809,631 A | 3/1989 | Kramer | |
| 4,909,638 A * | 3/1990 | Muto | 384/273 |
| 5,001,816 A | 3/1991 | Oetiker | |
| 5,113,036 A | 5/1992 | Arroyo et al. | |
| 5,364,192 A | 11/1994 | Damm et al. | |
| 6,186,691 B1 * | 2/2001 | Rudolf-Bauer | E04B 1/6813 403/297 |
| 6,367,980 B1 * | 4/2002 | Kobayashi | A61B 6/035 384/504 |
| 7,028,403 B2 | 4/2006 | Takahashi et al. | |
| 7,168,151 B2 * | 1/2007 | Niimi et al. | 29/596 |
| 7,478,719 B2 | 1/2009 | Voegele | |
| 8,147,162 B1 * | 4/2012 | Burnett | F16B 5/0052 312/263 |
| 2007/0232502 A1 * | 10/2007 | Tsutsui et al. | 508/104 |
| 2008/0267543 A1 * | 10/2008 | Wade et al. | 384/106 |
| 2009/0136169 A1 * | 5/2009 | Katayama | F16C 9/02 384/457 |

FOREIGN PATENT DOCUMENTS

| | | |
|---|---|---|
| CN | 201373019 Y | 12/2009 |
| CN | 101878373 A | 11/2010 |
| CN | 102407930 B | 4/2015 |
| DE | 514691 A | 12/1930 |
| DE | 864485 B | 1/1953 |
| DE | 1921887 U | 8/1965 |
| DE | 1803413 A | 5/1969 |
| DE | 1531745 B | 7/1970 |
| DE | 1575519 C | 3/1972 |
| EP | 0 595 630 A1 | 5/1994 |
| EP | 1 650 454 A1 | 4/2006 |
| EP | 2 212 572 B1 | 8/2010 |
| GB | 378713 A | 8/1932 |
| JP | S53-103081 U | 8/1978 |
| JP | 59-81296 A | 5/1984 |
| JP | S63-99041 U | 6/1988 |
| JP | 02-292506 A | 12/1990 |
| JP | 09-317753 A | 12/1997 |
| JP | 2003-322184 A | 11/2003 |
| JP | 2006-118713 A | 5/2006 |

\* cited by examiner

RUDDER BEARING

The invention relates to a bearing element of a rudder bearing for mounting a rudder stock or a rudder trunk of a rudder of a watercraft, in particular a ship.

Known rudders for watercraft comprise a rudder blade and a rudder stock connected to the rudder blade in order to be rotatable about the rudder. The rudder stock is generally mounted by means of one or two bearings in the hull. An (upper) rudder carrier bearing is thereby disposed on the upper end of the rudder stock facing the steering engine located in the interior of the ship. Another (lower) rudder carrier bearing is optionally disposed further in the direction of the other end of the rudder stock on the rudder blade side, in particular shortly before the emergence of the rudder stock from the hull or the skeg. In practice, different types of rudders, for example, floating rudders, semi-balanced rudders, rudders mounted in the bottom of the stern etc. have rudder carrier bearings or rudder stock bearings. Also rudder arrangements may or may not have rudder trunks. The rudder trunk is a hollow body connected to the ship structure and configured as a cantilever beam which projects into the interior of the rudder blade and inside which a rudder stock is disposed. It is known that bearings can be disposed between rudder trunk and rudder stock, in particular in the lower area, i.e. in the area located at a distance from the ship structure, which bearings are in particular called "neck bearings". It is also possible that additionally or alternatively to the mounting of the rudder stock in the rudder trunk, the rudder trunk itself is mounted on the rudder blade by means of suitable bearings. With reference to the present invention, the term "rudder bearing" is to be understood in such a manner that this can comprise all the bearings of a rudder stock or also of a rudder trunk, for example, the upper rudder carrier bearing, the lower rudder carrier bearing, a neck bearing, bearings between rudder trunk and rudder blade etc.

Rudder bearings known from the prior art normally have radial bearings or consist of a radial bearing. Alternatively or additionally, the rudder bearings can also comprise axial bearings. In principle, however, radial and axial bearings can also be formed separately from one another in two separate bearings.

Rudder bearings are usually formed as friction bearings, i.e. the normally two elements of a radial or also axial bearing of a rudder bearing (bearing elements) to be mounted move directly past one another or separated only by a lubricating film. Therefore, no additional roller bodies or the like are usually to be provided in rudder bearings. The radial and/or axial bearings in rudder r bearings usually each comprise two bearing elements which can be moved with respect to one another.

Due to the frequent turning of the rudder stock when setting the rudder in the course of operating a rudder, the bearing elements of the radial and/or the axial bearing of the rudder bearing wear and must be renewed relatively frequently. The manufacture and installation of the frequently very large and heavy bearing elements is technically complex and therefore costly.

It is therefore the object of the present invention to provide a bearing element for a rudder bearing or a rudder bearing which can be installed and removed more easily or which can be manufactured or mounted more inexpensively. The solution of this object is achieved with a bearing element or a rudder bearing having such a bearing element.

Accordingly, in accordance with the invention, a bearing element of the radial or axial bearing of a rudder bearing is configured to be segmented and comprises at least three separate segments, which are combined to form the bearing element. By dividing the bearing element into at least three separate segments, assembly is significantly simplified since now at least three significantly lighter and smaller segments compared to a bearing element formed in one piece are to be used by the appropriate assembly personnel. These individual segments are then combined by the fitter around the rudder stock to form a bearing element.

The individual segments of the bearing element are configured as annular segments, i.e. the individual annular segments are parts of an annularly configured bearing element, i.e. a bearing ring or an annular bearing disk or also a bearing bush. The bearing element composed of the individual annular segments is homogeneous and inherently fixed. This means that the individual annular segments are not movable towards one another or relative to one another. The individual annular segments are therefore fixed relative to one another so that the individual bearing element is optionally movable as a whole in the respective bearing (if this is provided in the respective bearing) but not individual annular segments independently of one another. The individual annular segments are in particular not configured to be tiltable or rotatable. An inherently fixed homogeneous bearing element is achieved by the individual annular segments each abutting against at least two further annular segments and providing connecting means by which means the contiguous or adjacent annular segments can be firmly interconnected. The configuration as homogenous bearing element means that the individual interconnected annular segments form a complete bearing ring or a complete bearing bush which does not differ or does not differ significantly in its functioning mode from that of a one-piece bearing ring or one-piece bearing bush. Accordingly, the bearing element is also not configured as one-piece but is composed of a plurality of fundamentally independent annular segments.

The individual annular segments abut against at least two further annular segments, i.e. they have common points of contact with these at least two further annular segments. The annular segments are preferably configured in such a manner that they each abut flat against a neighbouring annular segment, where preferably one annular segment then lies between two neighbouring annular segments and abuts flat against these two annular segments. In this way, the individual annular segments form a cohesive annular combination which is configured either as a bearing ring, e.g. in the form of an annular bearing disk, or also as a bearing bush.

The bearing element is configured in such a manner that it is movable as a whole with respect to another element of the bearing in which it is disposed, or conversely.

The formation of such a bearing element is not known from the prior art. The known bearing elements are on the contrary formed in one piece. In particular, the annular segments are firmly interconnected and thus together form a stand-alone bearing element that is fixed in itself without further means.

Due to the splitting of the bearing element into at least three sub-segments, storage of the bearing elements is simplified and manufacturing costs are reduced. In regard to the reduction of the manufacturing and storage costs, it should further be noted that the bearing elements can normally be very large, for example, they can have a diameter of up to one meter and as a result, smaller single segments are simpler to handle or manufacture.

The bearing element is configured as a bearing ring, in particular in the case of an axial bearing or also as a bearing bush or sleeve, in particular in the case of a radial bearing.

In principle, such bearing elements can be divided in an arbitrary manner into at least three individual annular segments. In the case of a bearing bush, the individual segments are configured as annular segments in a plan view, just as in the case of a bearing ring, which segments run continuously from the upper to the lower side of the bearing bush. It is envisaged to provide the individual annular segments in such a manner that the annular segments are combinable or can be combined around the rudder stock to form a bearing element. In this respect, the dividing lines between the individual annular segments in the mounted state usually run approximately vertically and not approximately horizontally.

The individual annular segments of a bearing element can in principle be produced by any suitable method known from the prior art. In particular, the individual annular segments can be produced by milling and cutting from a one-piece bearing element or other workpieces, or also directly as individual annular segments by injection moulding.

In principle, the individual annular segments are joined together by suitable connecting means for the combining to form a single bearing element. The dimensioning or shape of the individual annular segments can also be selected in such a manner that on combining the annular segments, these are interconnected by means of form or force closure.

It is particularly preferred that the bearing element comprises a plurality of individual annular segments since the advantages thereby achieved such as the simplification of the handling and the reduction of the manufacturing costs, are then shown particularly strongly to advantage. The plurality of annular segments can, for example, be a number from 5 to 100, 10 to 65, 64, 40 to 80, 50 to 70 or even 15 to 40 segments, each forming a single bearing element. Furthermore, for example, the following quantities of annular segments per bearing element are feasible, for example: 5 to 30, 10 to 20, 10 to 25, 15 to 20 and 16 segments.

Connecting means for connecting the annular segments to one another are to be provided. The annular segments can be fixed to one another by means of the connecting means in such a manner that these form a solid combination and therefore a single, solid bearing element. The connecting means can in particular be configured to produce a positive and/or to produce a non-positive connection between the annular segments. In particular, the connection made can be both positive and also non-positive. The connecting means are preferably configured in such a manner that a detachable connection can be made with said means, i.e. the annular segments are detachable interconnected. As a result, the bearing elements can easily be dismantled again into individual annular segments during maintenance work and similar.

If the connecting means are to be provided to produce a non-positive connection, it is preferred that these connecting means are configured to be elastic or comprise elastic means. Due to the provision of such elastic means, the making of a non-positive connection can be accomplished in a particularly simple manner.

In principle, the connecting means can comprise any means known from the prior art and suitable for connecting individual annular segments. In a preferred embodiment, the connecting means comprises recesses in the annular segments and counterparts which can be inserted in these recesses. Recesses and counterparts in engagement with one another are, for example, provided on or firmly attached to different annular segments disposed adjacently to one another. Alternatively, the counterpart can be configured as a separate component which is not firmly attached to an annular segment, where the counterpart can then advantageously be introduced into at least two recesses of different annular segments in order to interconnect these two annular segments. The counterparts here are preferably configured in such a manner that they can be inserted positively in the recesses. In principle, a non-positive insertion of the counterparts in the recesses could also be feasible. For example, the counterpart can be a web protruding from the annular segment or a protruding cam or the like, which engages in the individual recesses. Expediently the recesses and also the counterparts are each provided in the area of the individual edges or the lateral regions of the annular segments, with which the annular segments adjoin or abut against another annular segment.

The recess can in principle be any type of recess in the segment body, for example, a groove, an aperture, a blind hole, an indentation or the like. Both the recess and also the counterparts are in one embodiment formed in one piece on the respective annular segment so that no additional components or the like must be provided here. The annular segment body is usually fully formed, i.e. not hollow.

The connecting means advantageously comprise a latching connection. By this means, the connection between two annular segments can advantageously be released again by unlatching the latching connection, e.g. in the course of maintenance work. The latching connection can fundamentally be configured in any suitable manner. It preferably comprises at least one elastic latching element. In the case of providing recesses and counterparts engageable in said recesses as connecting means, the latching connection can, for example, be formed by a groove or another indentation and a corresponding latching part which can be introduced into the groove or the indentation, which is preferably configured to be elastic.

In a further preferred embodiment, the counterparts have at least one undercut. This can be achieved in particular by the counterparts having a swallow-tail-shaped end region or being configured overall as swallow-tail-shaped. Alternatively, for example, T-shaped end regions of the counterparts or also merely generally a broadening of the end region of the counterpart can be provided. If the recesses are correspondingly configured, i.e. adapted to the shape of the counterparts, a positive connection can then be achieved in a simple manner by providing undercuts or the swallow-tail. The improved strength of the connection can be achieved by either the counterpart or the area of the recess or both having a certain elasticity. Alternatively or additionally, recesses and counterparts can be designed in the form of an interference fit to produce a non-positive connection.

In one embodiment each annular segment has a same number, in particular two, of recesses and counterparts, with the recesses and counterparts of one annular segment preferably being arranged opposite to one another on the respective annular segment. The other annular segments are advantageously configured identically in relation to their shape and arrangement of recesses and counterparts, so that the counterparts of a first annular segment can engage in the recess of a second annular segment and the counterparts of a third annular segment can engage in the recesses of the first annular segment. The annular segments each abut against two other annular segments. In such embodiments the counterparts should be provided in the first contact region and the recesses in the second contact region or conversely.

In an alternative embodiment, in each case only recesses and no counterparts are provided on the individual annular segments, where in each case one recess of one annular segment is advantageously disposed adjacently or contiguously to another recess of a contiguous or adjacent annular segment. In this embodiment, counterparts formed as separate components are additionally to be provided, which counterparts each engage in two recesses of different adjacently disposed annular segments and therefore fix the annular segment with respect to one another.

In order to improve the force closure, a cavity, a recess or an aperture can be provided in the counterpart. By this means the elasticity of the counterpart can be increased insofar that this can be compressed during insertion into a corresponding recess and expands after compression in the recess and comes to rest non-positively on the side walls of the recess. This is particularly advantageous for making non-positive connections and/or latching connections.

In a further preferred embodiment the annular segments have an inner, usually arcuate or rectilinearly running edge, an outer usually arcuate or rectilinearly running edge and two lateral, substantially rectilinearly running edges. The inner edge of an annular segment together with the further inner edges of the further annular segments form the inner annular edge. Accordingly, the outer edge forms the outer annular edge. Such annular segments are particularly advantageous for producing a bearing element configured as a bearing ring. In principle, however, such annular segments can also be used for an annular bush, with the annular segments then advantageously running continuously in the axial direction of the bush from top to bottom. The non-positive connection of the individual annular segments to form a single bearing element can then be improved in a simple manner by such a configuration since a type of non-positive wedge connection can be obtained by the contiguous lateral edges of the individual annular segments.

The two lateral edges of one or more of the annular segments can run at an angle with respect to one another. In principle, however, these can also be configured to run parallel to one another. Also the angle can be same for all annular segments or also different. The angle should preferably be aligned in such a manner that the inner edge of the individual annular segments is shorter than the outer edge. Furthermore, preferably at least one of the lateral edges can run approximately at a right angle to the inner and/or to the outer edge. The manufacturing process can be further simplified by this means. For example, annular segments having different angles can be specified at the manufacturers, which can then be combined as required in order to achieve a certain desired bearing element. In this respect not all the annular segments must be tailor-made for a specific bearing element but can also be manufactured for stock.

In a preferred embodiment, one or several, preferably all, of the annular segments of a bearing element comprise a material which comprises a solid lubricant. Such solid lubricants give the bearing element self-lubricating properties, whereby the entire bearing, in which the bearing element is inserted, becomes a self-lubricating bearing or "solid friction bearing". Such bearings manage without additional lubrication or lubricants since embedded solid lubricants (solid lubricants) are present in the material manufactured from them, which lubricants reach the surface during operation due to micro-wear and thereby lower friction and wearing of the bearings. In particular, plastic or plastic composites and/or ceramic structural materials are used to form such bearing elements. Examples of such materials are PTFE (polytetrafluoroethylene) and ACM (acrylate rubber). Graphite-containing materials or composites can also be used to produce the annular segments of the bearing elements. By this means the structure of the rudder carrier bearing in which the bearing element according to the invention is to be inserted can be further simplified since no additional means to provide a lubricating film or the like and no external lubricants need to be provided. This is also advantageous from ecological aspects since no lubricants such as grease or oil can enter into the environment from the bearing. It is furthermore advantageous that, unlike conventional bearing elements frequently consisting of metal, which are made of bronze, for example, the risk of seizing in self-lubricating bearings is almost eliminated. Furthermore, such bearings are extremely low-maintenance.

Regardless of the self-lubricating properties of the bearing element, single or several annular segments, preferably all, of the bearing element can comprise a non-metallic material, having preferably elastic properties. This material can be a plastic, in particular one of the aforesaid plastics.

In another preferred embodiment the bearing element has a high permissible surface pressure. In particular the surface pressure should be at least 40 N/mm$^2$, preferably at least 75 N/mm$^2$, particularly preferably at least 90 N/mm$^2$. This can be accomplished on the one hand by providing corresponding connecting means between the individual annular segments, which enable an additional stiffening of the bearing element. A favourable choice of material can also positively influence the permissible surface pressure.

In a further preferred embodiment one or more, preferably all, of the annular segments consist of a material which comprises a component A and a component B. In this case, component A is a thermoplastic polyester. Component B can preferably be an elastic material, for example, an elastomer, with the material preferably consisting of at least 70%, particularly preferably at least 85% of component A. By this means, a particularly suitable material can be achieved for the manufacture of the bearing ring or the individual annular segments since a high permissible surface pressure, a good processability into individual annular segments and a good integral manufacture of recesses and corresponding counterparts is rendered possible. The material can consist exclusively of components A and B.

In a further preferred embodiment in a boundary region in which two annular segments abut against one another or adjoin one another, a recess is provided in one or in both of the adjoining annular segments. The recess can be continuous or present as an indentation only in certain areas. For example, a tool or the like can be inserted in such a recess when a bearing ring consisting of annular segments is to be dismantled again. Dismantling is thereby simplified. The recess is particularly preferably disposed approximately centrally in relation to the contact edges between two annular segments.

The object forming the basis of the invention is furthermore achieved by a rudder bearing, in particular an upper rudder carrier bearing, comprising a bearing element according to the invention. In such a rudder bearing, an axial bearing and/or a radial bearing can be configured as a self-lubricating bearing. Advantageously the rudder bearing comprises both axial and also radial bearings.

Figure 2:
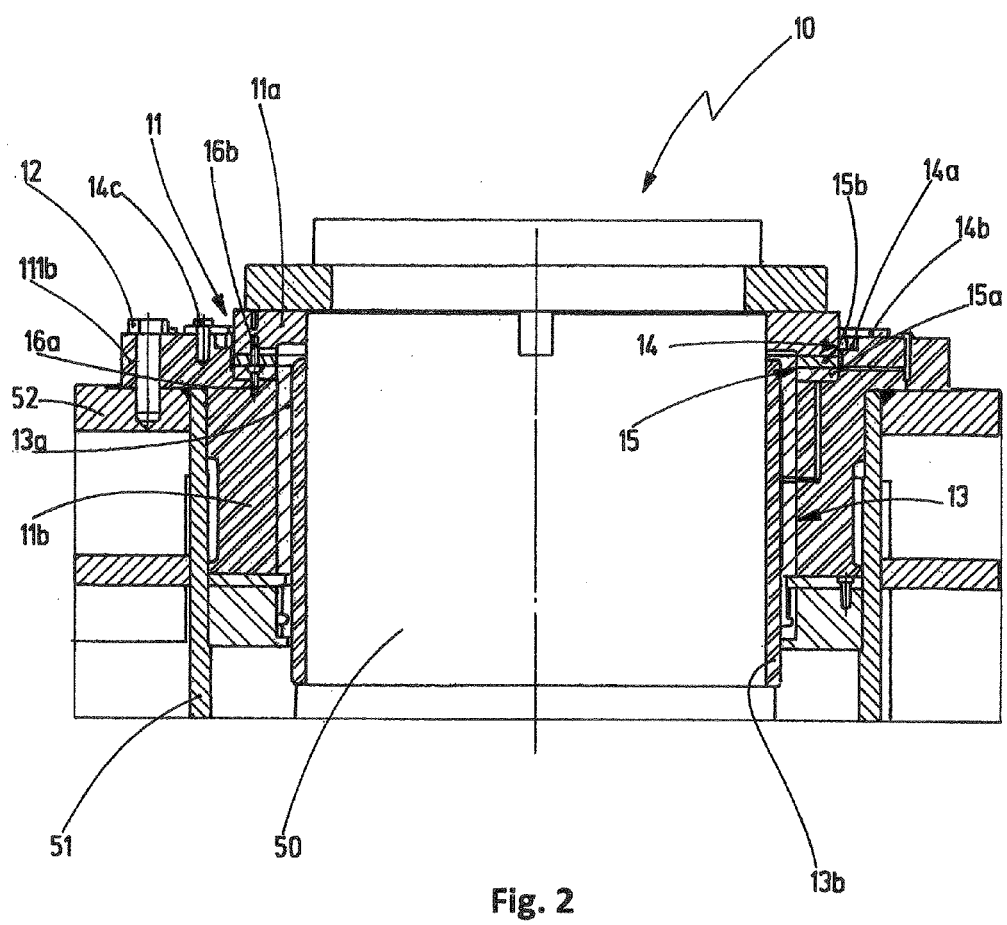
Figure 3:
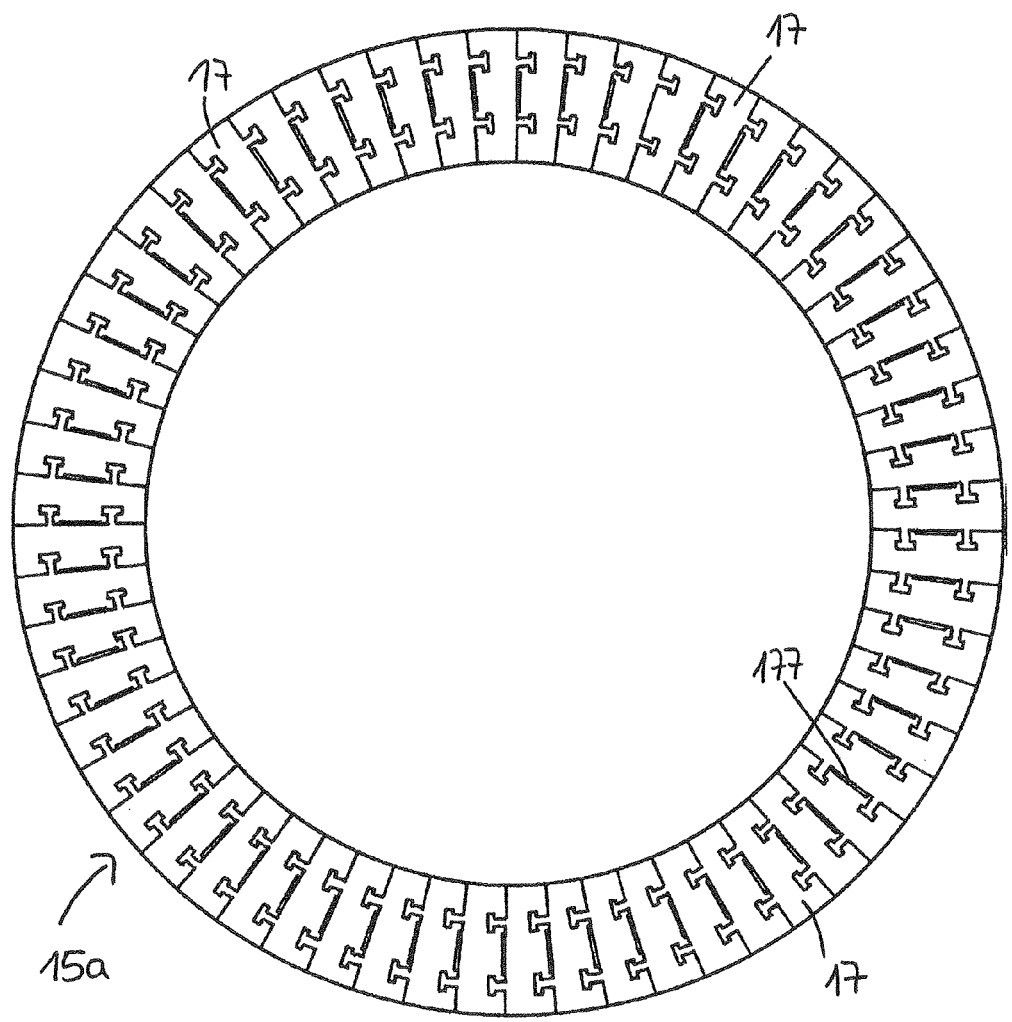
Figure 4:
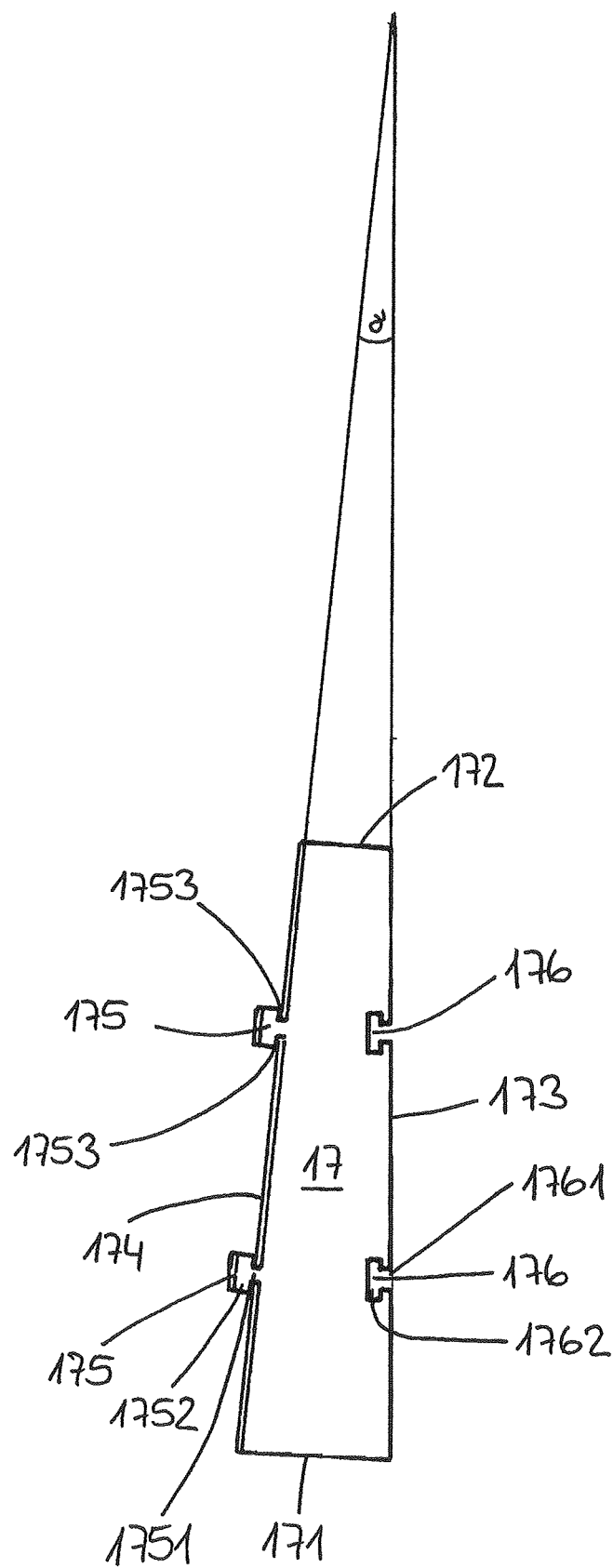
Figure 5:
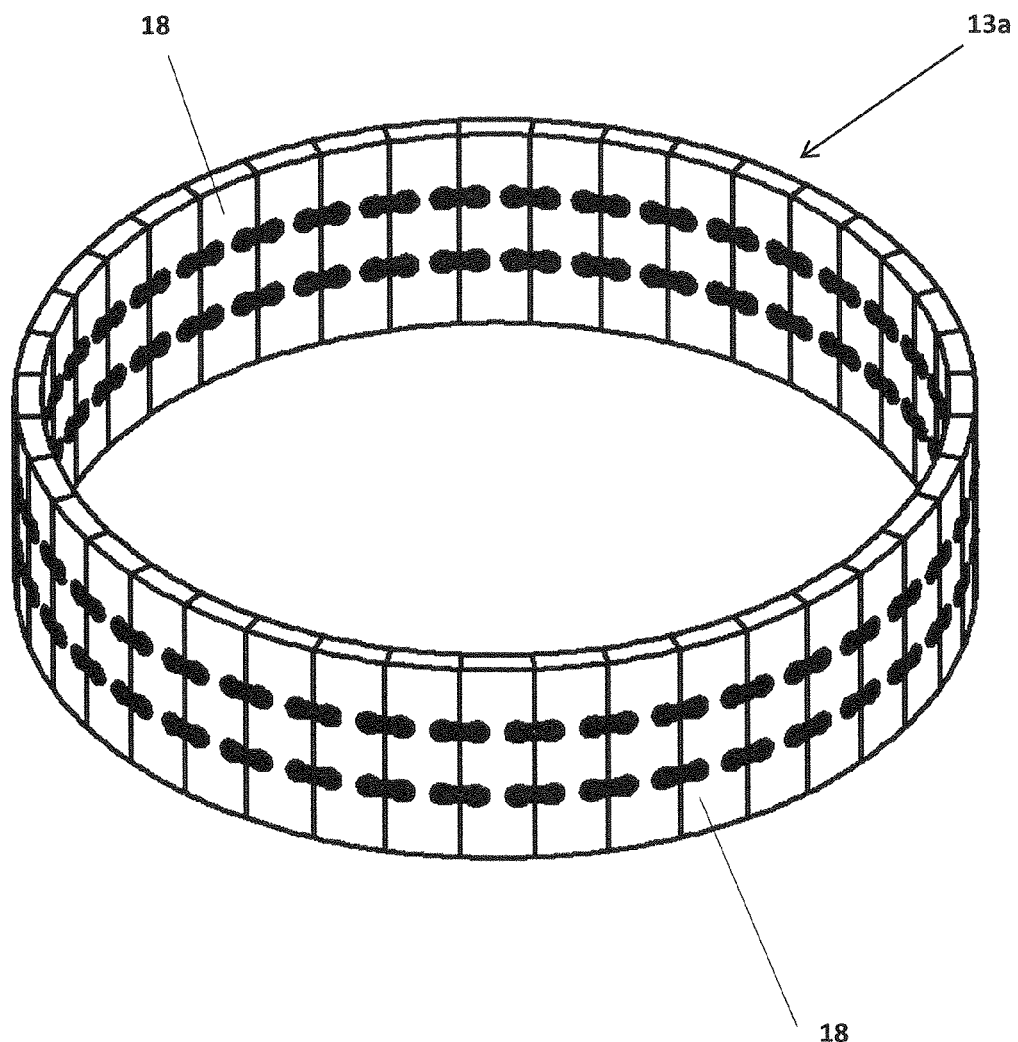
Figure 6:
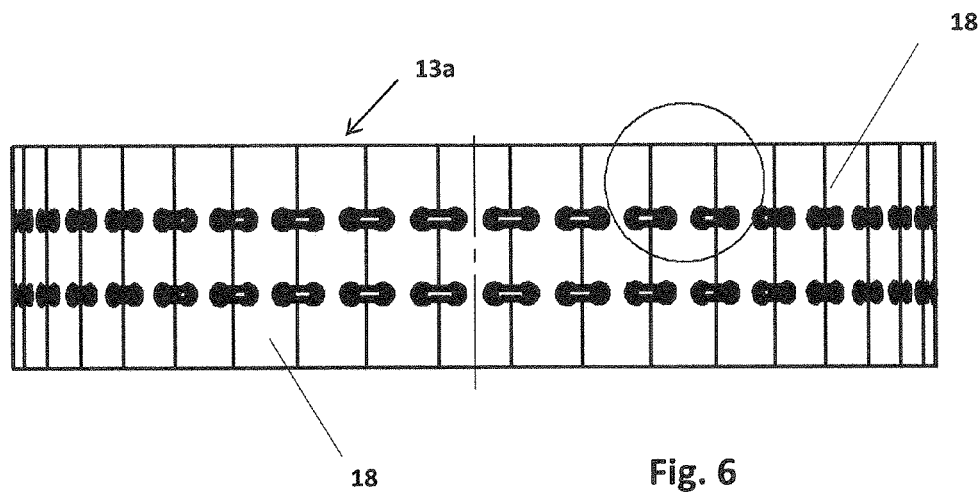
Figure 6A:
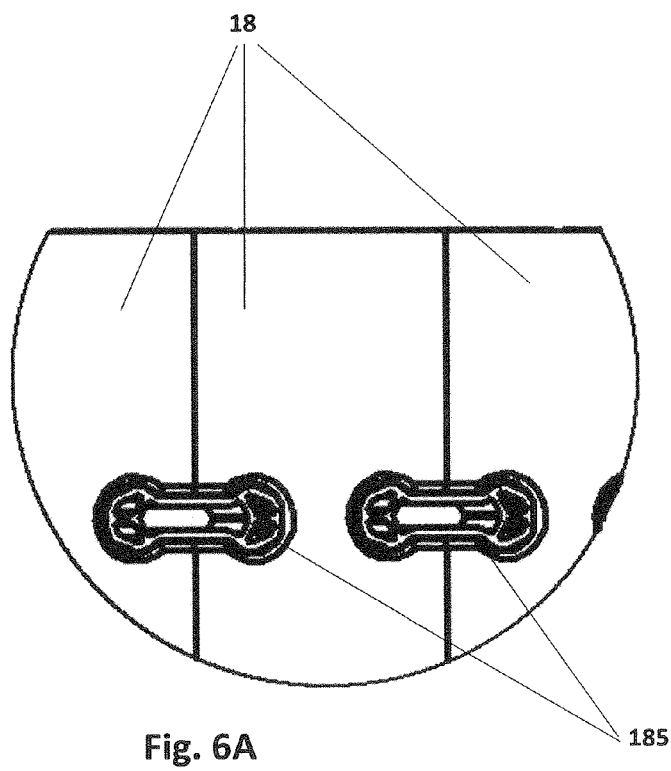
Figure 7:
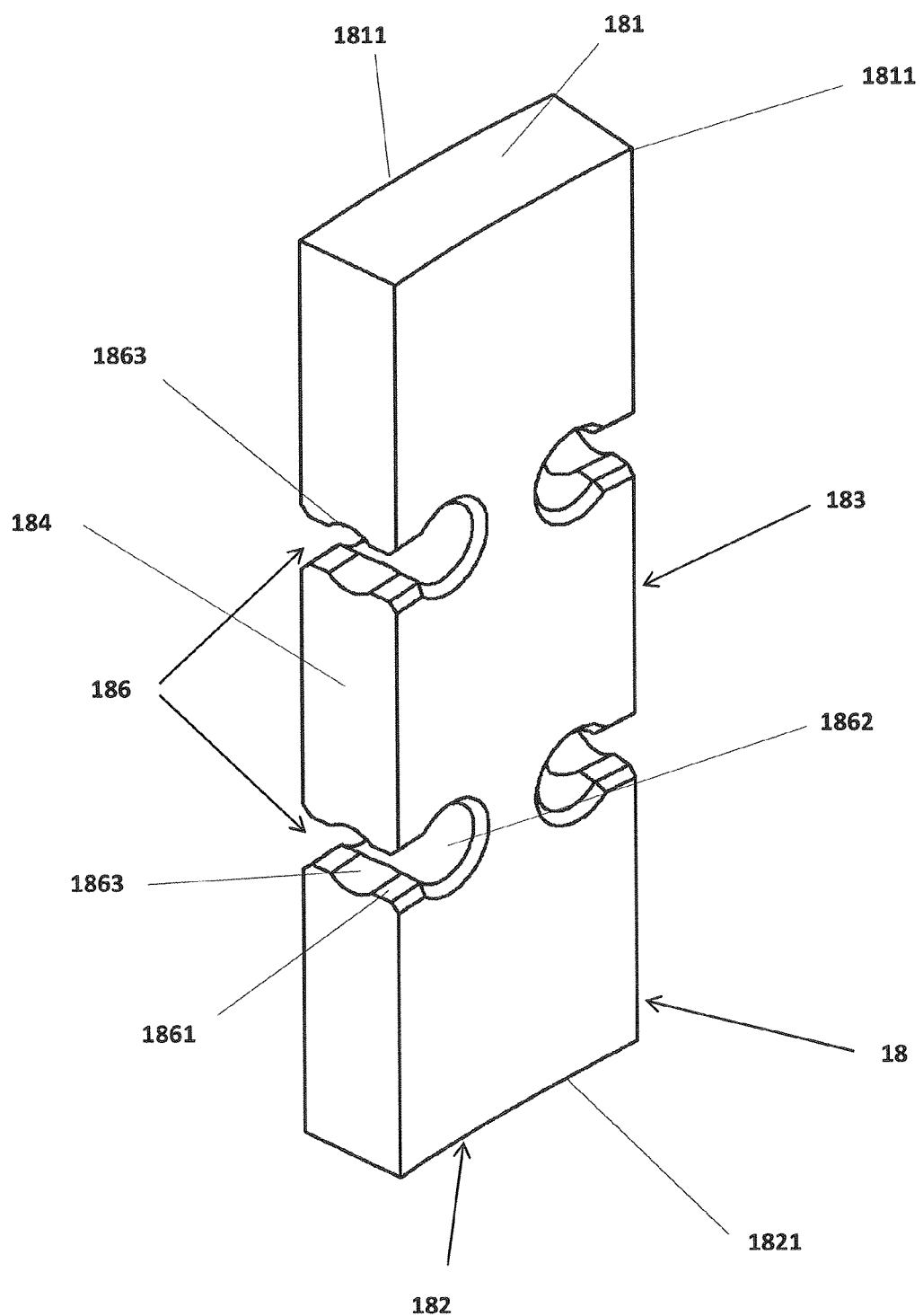
Figure 8:
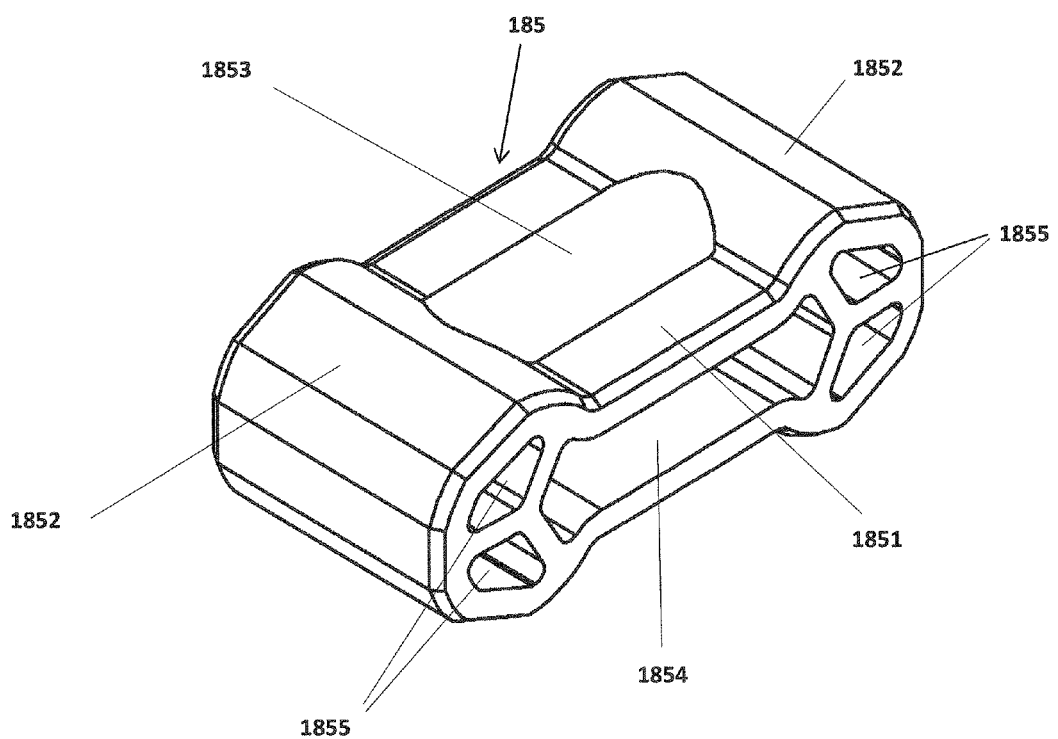

The invention is explained further with reference to exemplary embodiments shown in the drawing. In the figures, schematically:

FIG. 1 shows a sectional view of a rudder stock with rudder trunk and an upper carrier bearing, FIG. 2 shows a detailed view of the carrier bearing from FIG. 1, FIG. 3 shows a plan viewed of a segmented bearing ring of the carrier bearing from FIGS. 1 and 2, FIG. 4 shows a detailed view of an annular segment of the bearing ring from FIG. 3, FIG. 3 shows a perspective view of a segmented bearing bush of the carrier bearing from FIGS. 1 and 2, FIG. 6 shows a side view of the bearing bush from FIG. 5, FIG. 6A shows a detailed view of the bearing bush from FIG. 6, FIG. 7 shows a perspective individual view of an annular segment of the bearing bush from FIGS. 5 and 6 and FIG. 8 shows a perspective individual view of the counterpart of the bearing bush from FIGS. 5 and 6.

FIG. 1 shows a sectional view of a rudder stock 50 around which a rudder trunk 51 is arranged. In the mounted state the lower rudder stock end 50a and the lower trunk end 51a are inserted in a rudder blade (not shown here) and the lower rudder stock end 50a is connected to the rudder blade. A carrier bearing 10 is arranged on the upper rudder stock end 50b located in the hull in the area of the steering engine (not shown here). In principle, rudder arrangements without rudder trunks can also have carrier bearings.

FIG. 2 shows the carrier bearing 10 from FIG. 1 in a detailed sectional view. The carrier bearing 10 comprises a bearing housing 11, which in turn consists of an upper housing cover 11a and a lower housing base body 11b. The housing cover 11a and the housing base body 11b can, for example, be made of steel. The housing base body 11b is configured in the manner of a cylindrical sleeve, on the upper outer edge zone whereof there is provided a peripheral fastening section 111b protruding outwards by approximately 90°, which is configured as a flange. Holes or through-holes are provided at regular intervals in the fastening section 111b, through which the housing base body 11b is connected to the hull 52 by means of bolts 12. A radial bearing 13 is provided in the interior of the housing base body 11b, which bearing comprises a bearing bush 13a and a rudder stock sleeve or a rudder stock cover 13b. The bearing bush 13a and the rudder stock sleeve 13b sitting firmly on the rudder stock 50 form the two bearing partners (bearing elements) of the radial bearing 13 which are movable relative to one another. The cylindrical bearing bush 13a abuts with its outer jacket on the inner jacket of the housing base body 11b and can be connected to the housing base body 11b, for example, by means of thermal expansion, also called "freezing". A peripheral groove 14 is provided on the upper side of the fastening section 111b of the housing base body 11b and adjoining the housing cover 11a, inside which groove a shaft sealing ring 14a is arranged. The shaft sealing ring 14a or the groove 14 are sealed towards the top by an annular cover 14b which is connected to the fastening section 111b by means of bolts or screws 14c.

Furthermore, the carrier bearing 10 comprises an axial bearing 15 that comprises a first annular disk 15a and a second annular disk 15b abutting against the first annular disk 15a. The first and the second annular disk 15a, 15b thus form a bearing pair of two bearing elements of the axial bearing 15 which can be moved with respect to one another. The first annular disk 15a is connected to the housing base body 11b by means of a plurality of peripherally arranged screws 16a whereas the second annular disk 15b is connected to the housing cover 11a by means of a plurality of screws 16b arranged in a peripherally distributed manner. Since the housing cover 11a is firmly connected to the rudder stock 50, this co-rotates with the rudder stock 50. Accordingly, the second annular disk 15b also co-rotates upon rotation of the rudder stock 50 and said disk also rotates relative to the first fixed annular disk 15a. The housing cover 11a, the housing base body 11b, the two annular disks 15a, 15b, the bearing bush 13a and also the rudder stock sleeve 13b are all arranged coaxially to the rudder stock 50.

FIGS. 3 and 4 show the first annular disk 15a of the axial bearing 15 of the carrier bearing 10 in plan view. It can be seen that the bearing element (first annular disk) 15a is composed of a plurality of individual annular segments 17. The annular segments 17 are configured as annular segments. The annular segments 17 are formed from a plastic, which comprises a solid lubricant. The other corresponding bearing element 15b (second annular disk) of the axial bearing 15 is preferably formed from stainless steel. A particularly good material combination is thus obtained for a self-lubricating bearing. The bearing ring 15a shown in FIG. 3 is composed overall of sixty individual annular segments 17 which are joined together to form a homogeneous bearing ring. The individual annular segments 17 have an outer edge 171, an inner edge 172 and two lateral edges 173, 174. Further outer edges are not provided. The inner and outer edge 172, 171 are configured to be slightly arcuate, although in other embodiments these can also run rectilinearly. The lateral edges 173, 174 run substantially rectilinearly or are aligned rectilinearly. The lateral edges 173, 174 of the annular segments 17 do not run parallel to one another but at an angle α. In the bearing ring 15a shown in FIG. 3 all the annular segments 17 are configured identically. However, in particular in a different embodiment the angle α between the individual annular segments of a bearing ring or a bearing element can be varied. In particular, such annular segments having substantially parallel running lateral edges can be used. The annular segments 17 are arranged in such a manner that their inner and outer edges 171, 172 end substantially flush at respectively adjacent annular segments. The length of the individual annular segments 17 is identical in each case.

On their lateral edge 174 the annular segments 17 each have two counterparts 175 which are T-shaped. Two corresponding recesses 176 are provided opposite on the other lateral edge 173, which recesses can each receive a T-shaped counterpart 175. In relation to the longitudinal direction, respectively one recess 176 and one counterpart 175 are arranged at the same height. The counterparts 175 and the recess 176 are arranged distributed uniformly over their respective lateral edge 173, 174 with regard to their distance from one another and their distance to the outer edges 172, 173. The annular segments 17 adjoin another annular segment 17, therefore two in total, with their lateral edges 173, 174, with the counterparts 175 of a first annular segment each engaging in corresponding recesses 176 of a second annular segment, whereas counterparts 175 of a third annular segment engage in the recesses 176 of the first annular segment. Due to the T-shaped formation of the counterparts 175, these have a narrow web 1751 protruding from the lateral edge 174, which is adjoined by a wider transverse web 1752. Due to the broadening the regions of the transverse web 1752 facing the lateral edge 174 form undercuts 1753. The recesses 176 accordingly have a narrow point 1761 running inwardly from the lateral edge 173 and an adjoining broadening 1762. The counterparts 175 and the indentations or recesses 176 can be formed as fitting exactly or as an interference fit. In principle, a clearance fit would also be possible although this is rather not advantageous in the present case. In the annular segments 17 of the bearing ring 15a shown in FIG. 3, respectively one recess 177 or inwardly drawn section is provided on the lateral edge 173 between the two recesses 176, which recess runs parallel to the lateral edge 173. The recess 177 can run downwards through the entire annular segment or only in partial regions. In particular, the recess 177 is suitable for inserting a tool therein so that a segmented bearing ring 15a can possibly be dismantled more easily. Thus, individual annular segments 17 can be inserted into other annular segments relatively easily from above or removed from these again upwards.

FIGS. 5, 6 and 6A each show the bearing bush 13a of the radial bearing 13 of the carrier bearing 10. The bearing bush 13a consists of forty individual annular segments 18, where each individual segment each abuts directly against two further annular segments 18 and are each firmly connected to this segment by means of connecting means consisting of counterparts 185 and corresponding recesses 186. Overall an inherently closed, fixed and homogeneous bearing bush is obtained, which fundamentally corresponds in its functions to those of a one-piece bearing bush. In principle, it would also be possible, alternatively or additionally, to configure the rudder stock sleeve 13b as a segmented bearing bush. Similarly to the segmented bearing ring or the annular disk from FIGS. 3 and 4, here also the annular segments 18 are formed from a plastic which comprises a solid lubricant. The rudder stock sleeve 13b with respect to which the bearing bush 13a moves relatively or conversely, is preferably formed from stainless steel. Two counterparts 185, disposed at a distance from one another, are disposed in each case between two annular segments 18, which counterparts each engage in two recesses 186, where the two recesses 186 are provided on different, i.e. adjacent annular segments 18.

FIG. 7 shows a perspective individual view of an annular segment 18 and FIG. 8 shows a perspective view of an individual counterpart 185. The annular segment 18 has a front outer surface 181, a front inner surface 182 and two lateral surfaces 183, 184 disposed on the narrow sides. All the surfaces 181, 182, 183, 184 are configured to be flat and are each at an angle of about 90° to their two adjacent surfaces. In this respect, the two lateral surfaces 183, 184 and the two inner or outer surfaces 181, 182 are each aligned parallel to one another. In the bearing bush 13a shown in FIGS. 5 and 6, all the annular segments 18 are formed identically. The individual annular segments 18 each abut with their lateral surfaces 183, 184 against adjacent annular segments over the entire surface. The longitudinal edges 1811, 1821 of the inner and outer front surface 181, 182 are each formed to be slightly arcuate so that all the annular segments 18 can be joined together to form a closed, circular or cylindrical bush 13a in plan view. Two recesses 186 each are provided in the lateral surfaces 183, 184, which are all four configured identically. The individual recesses 186 are each disposed at the same distance from their partner recess on both sides and are each located at about one third or two thirds of the total height of the annular segment 18. With regard to their form, they run from the lateral surface 183, 184 inwards, initially with a narrow point 1861, which broadens in the further course to a broadening 1862 which at the same time forms the end region of the recess 186. In the side views the broadening 1862 has an approximately pinhead-like shape. A groove or indentation 1863 is provided at the narrow point 1861 approximately centrally and parallel to the transverse direction of the annular segment 18. This groove 1863 is provided both in the lower and in the upper edge zone of the narrow point 1861.

The counterpart 185 has a central web 1851. Adjoining both end regions of the central web 1851 when viewed in the longitudinal direction of the counterpart 185 is respectively one end head 1852 terminating the counterpart 185, which is broadened compared with the web 1851 or has a greater width. The end heads 1862 are configured in such a manner that they can each engage positively in a broadening 1862 of a recess 186. Thus, a counterpart 185 can engage in two contiguous recesses 186 of two different but adjacently disposed or contiguously disposed annular segments 18. The central web 1851 then engages in the two narrow points 1861 of the recesses 186 and in its central region in the longitudinal direction of the counterpart 185, has respectively one outwardly projecting protuberance 1853, running parallel to the outer edges, on each side. These protuberances 1853 are configured for engagement in the grooves 1863 of the recess 186. The central web 1851 consists of two parallel outer walls, between which a cavity 1854 is provided. Two further channel-shaped cavities 1855, continuous from one front side to the other, are provided inside each of the end heads 1852. As a result of forming the counterpart 185 from a material having elastic properties and/or providing the cavities 1854, 1855, the counterpart 185 has slightly elastic or resilient properties. Thus, for example, when inserting the counterpart 185 into a recess 186, the two outer side walls of the central web 1851 can be slightly compressed so that the protuberance 1853 can engage in the groove 1863. The protuberance 1853 and the groove 1863 thus together form a detachable latching connection.

REFERENCE LIST

10 Carrier bearing
11 Bearing housing
11a Housing cover
11b Housing base body
111b Fastening section
12 Bolt
13 Radial bearing
13a Bearing bush
13b Rudder stock sleeve
14 Groove
14a Shaft seal
14b Annular cover
14c Screw
15 Axial bearing
15a First annular disk
15b Second annular disk
16a, 16b Screws
17 Annular segment/bearing ring
171 Outer surface
172 Inner surface
173 Lateral surface
174 Lateral surface
175 Counterparts
1751 Web
1752 Transverse web
1753 Undercuts
176, 179 Recess
1761 Narrow point
1762 Broadening
177 Recess
18 Annular segment/bearing bush
181 Outer surface
1811 Longitudinal edge
182 Inner surface
1821 Longitudinal edge
183 Lateral surface
184 Lateral surface
185 Counterpart
1851 Central web
1852 End head 1853 Protuberance
1854, 1855 Cavity
186 Recess
1861 Narrow point
1862 Broadening
1863 Groove
50 Rudder stock
50a Lower stock end
50b Upper stock end
51 Rudder trunk
51a Lower trunk end
52 Hull

The invention claimed is:

1. A rudder bearing for mounting a rudder stock or a rudder trunk of a rudder of a watercraft, wherein the rudder bearing is configured as a radial bearing or as an axial bearing, comprising:
   a ring-shaped, segmented bearing element having at least three separate annular segments, each annular segment having two lateral surfaces, an inner arcuate surface configured for sliding contact with a rotating element, and at least one recess in each of the two lateral surfaces;
   each lateral surface abuts a respective adjacent one of the at least three annular segments;
   wherein the ring-shaped, segmented bearing element further comprises separate elastically compressible counterparts;
   wherein the at least three annular segments are detachably interconnected by the counterparts to form a homogeneous, inherently fixed bearing element;
   wherein each counterpart has a central web and two end heads, one end head at a respective one of opposing ends of the central web, wherein the end heads have a greater width compared with the central web;
   wherein the counterparts are configured to produce a connection between the at least three annular segments due to the elasticity of the counterparts;
   wherein a first one of the two end heads of each counterpart is configured for engagement with one of the at least one recesses of a respective first annular segment of the at least three annular segments and wherein a second one of the two end heads of each counterpart is configured for engagement with one of the at least one recesses of a respective second annular segment of the at least three annular segments, wherein the respective first annular segment and the respective second annular segment abut against each other;
   wherein the at least one recess of each lateral surface extends in a respective inward circumferential direction and entirely through a respective radial thickness of each lateral surface, the at least one recess of each lateral surface having, in a respective area adjacent to each lateral surface, a respective narrow section which broadens in the respective inward circumferential direction to a respective broadening section which forms a respective end region of the at least one recess of each lateral surface,
   a respective groove or indentation extending away from each narrow section;
   wherein a cavity or an aperture is provided in the central web and/or in the end heads of each counterpart to increase the elasticity of each counterpart so that each counterpart can be compressed during insertion into a respective corresponding one of the at least one recesses of the respective first annular segment or of the respective second annular segment; and
   wherein in an interconnected state, movement of any one of the at least three annular-segments in a radial direction of the bearing element is prevented by the connection between the at least three annular segments produced by the counterparts.

2. The rudder bearing according to claim 1, wherein the bearing element comprises 5 to 100 annular segments.

3. The rudder bearing according to claim 1, wherein the connection is a latching connection.

4. The rudder bearing according to claim 1, wherein each annular segment has an outer arcuate surface.

5. The rudder bearing according to claim 4, wherein the two lateral surfaces of each annular segment run at an angle with respect to one another in such a manner that the inner arcuate surface is shorter than the outer arcuate surface, and wherein one of the two lateral surfaces runs approximately at a right angle to the inner and outer arcuate surfaces.

6. The rudder bearing according to claim 1, wherein one or several of the at least three annular segments of the bearing element comprise a material which comprises a solid lubricant or a non-metallic material having elastic properties.

7. The rudder bearing according to claim 1 wherein the rotating element is a second bearing element which is movable relative to the first bearing element.

8. The rudder bearing according to claim 1, wherein the rudder bearing is configured as a self-lubricating bearing.

9. The rudder bearing according to claim 1, wherein the bearing element comprises 10 to 65 annular segments.

10. The rudder bearing according to claim 1, wherein the bearing element comprises 15 to 40 annular segments.

11. The rudder bearing according to claim 1, wherein the bearing element has a high permissible surface pressure of at least 75 N/mm$^2$.

12. The rudder bearing according to claim 1, wherein the bearing element has a high permissible surface pressure of at least 90 N/mm$^2$.

* * * * *